United States Patent [19]

Stoody

[11] Patent Number: 4,607,180
[45] Date of Patent: Aug. 19, 1986

[54] FAILURE TOLERANT LINEAR DRIVE MECHANISM INTENDED FOR CELESTIAL SPACE APPLICATIONS

[75] Inventor: William R. Stoody, San Diego, Calif.

[73] Assignee: General Dynamics Corporation/Convair Div., San Diego, Calif.

[21] Appl. No.: 551,630

[22] Filed: Nov. 14, 1983

[51] Int. Cl.⁴ ............................................. H02K 7/06
[52] U.S. Cl. ...................................... 310/80; 310/83; 310/112
[58] Field of Search ................... 310/80, 83, 112, 49, 310/114, 126

[56] References Cited

U.S. PATENT DOCUMENTS

| | | | |
|---|---|---|---|
| 2,769,430 | 11/1956 | Geyer | 310/83 UX |
| 2,860,266 | 11/1958 | Schrader | 310/83 X |
| 3,264,502 | 8/1966 | Lytle et al. | 310/49 |
| 3,278,774 | 10/1966 | Roller et al. | 310/80 X |
| 3,407,680 | 10/1968 | Westmoreland | 310/112 X |
| 3,950,686 | 4/1976 | Randall | 310/112 X |

Primary Examiner—Donovan F. Duggan
Attorney, Agent, or Firm—John R. Duncan; Frank D. Gilliam

[57] ABSTRACT

A self contained failure tolerant linear drive mechanism that is especially adapted for celestial space applications. First and second motors are concentrically connected to a shaft for axial movement through rotation of either or both of the motors. A locking mechanism having failure tolerant releasing means cooperates with each motor to provide for selective actuation of either motor and predetermined axial movement of the shaft.

13 Claims, 3 Drawing Figures

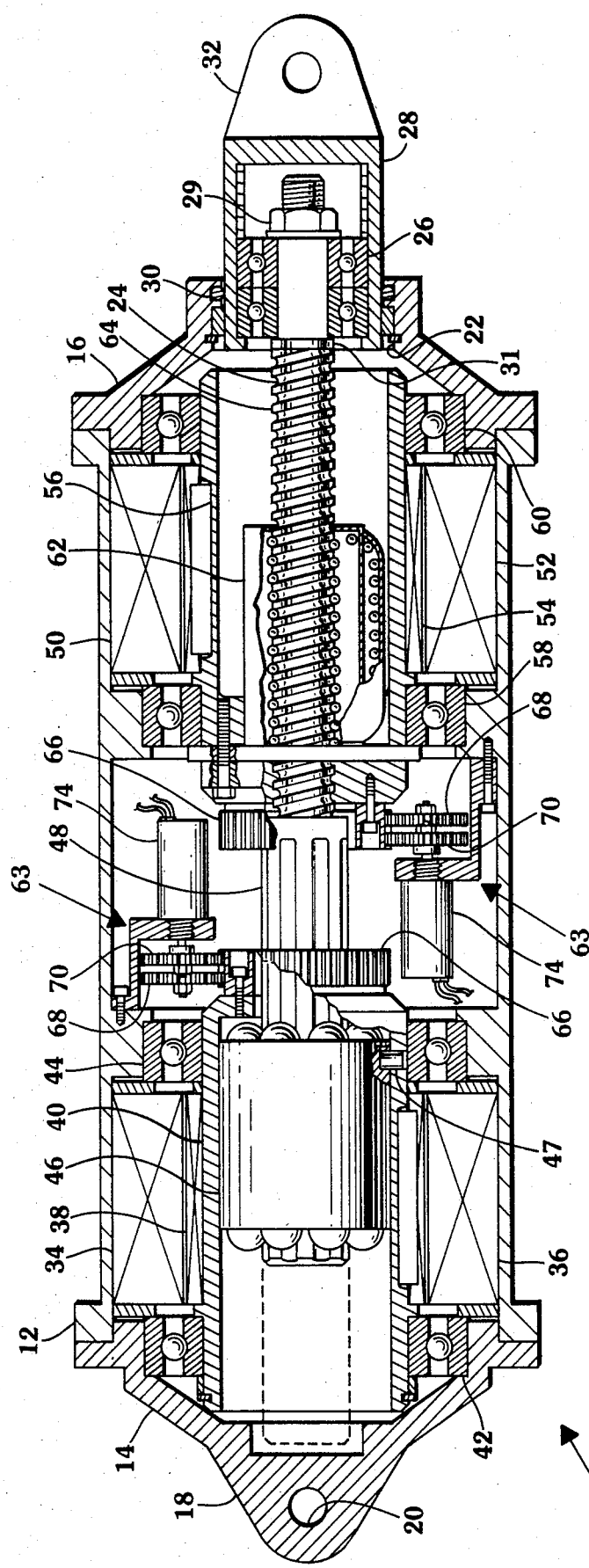
FIG. 1
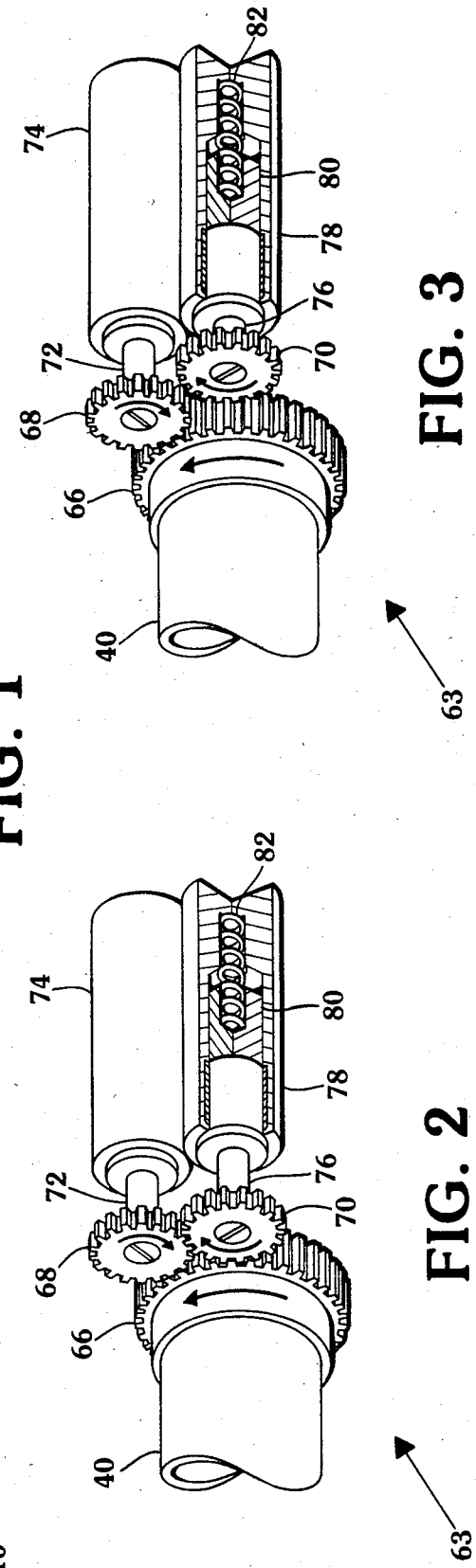
FIG. 2
FIG. 3

FAILURE TOLERANT LINEAR DRIVE MECHANISM INTENDED FOR CELESTIAL SPACE APPLICATIONS

BACKGROUND OF THE INVENTION

This invention relates generally to an improvement in linear actuators and more particularly, but not by way of limitation, to a failure tolerant linear drive mechanism particularly adapted for celestial space applications.

The present invention is directed to a failure tolerant, direct drive, linear motion mechanism which inocludes first and second high torque motors and an associated output shaft. The mechanism is adapted to convert rotational motion into longitudinal non-rotating reciprocative shaft motion when the motors are operated singly or concurrently. The motor to shaft coupling of each motor provides for operation of either motor without disengaging the other. In addition, the coupling means enables unimpeded operation of the linear drive mechanism in the event of a motor failure such as freewheeling or seizure. The present invention is intended for applications where continued use of the linear drive mechanism is essential if not critical. It will be appreciated that in aerospace applications and especially celestial space applications a linear drive mechanism must be able to operate at all times and tolerate failure of an actuating motor to prevent failure of the mission, loss of life or loss of property. Heretofore, the prior art has not disclosed a self contained failure tolerant linear drive mechanism which can tolerate a motor seizure and yet continue to operate.

U.S. Pat. No. 2,520,014 issued to Axel F. Rehnberg et al., discloses an industrial electrical control mechanism for machine tools which utilizes two remotely located electric motors which are separately located and separately mounted. The electric motors are connected to a feed screw by means of spline and screw shaft couplings along with associated belts, pulleys, and reduction gears. The mechanism is intended for use as an industrial drive mechanism and is not a failure tolerant integral linear actuator particularly adapted for space vehicle use.

U.S. Pat. No. 3,803,927 issued to Martin D. Lawler relate to a coaxial force and movement mechanism for a machine tool. The Lawler mechanism, like the Rehnberg mechanism, discloses a mechanism that is intended as part of an industrial control. It shows a remotely mounted and separately housed motor that is coupled to a shaft through a spline coupling and which, in association with a remotely located drive motor, causes linear axial movement of the shaft and a quill relative to a frame. Lawler does not disclose a self contained integral linear drive mechanism that is failure tolerant and which is particularly adapted to space vehicle applications.

The Schrader U.S. Pat. No. 2,860,266 and the Westmoreland U.S. Pat. No. 3,407,680 are similar in that they show self contained linear actuators which rely upon concurrent running and differential rotational speeds of two electric motors to provide reciprocative movement of a shaft. However, both mechanisms are not failure tolerant and if one motor fails the other motor will turn the rotor of the failed motor at the same speed and direction of the still running motor and since the resistance of the non-running motor to the rotational influence will normally be less than the resistance required for linear movement of the output shaft (due to externally imposed axial loads), the force produced by the running motor can be spent turning the rotor of the non-running motor thus producing no linear movement. Neither patent discloses a failure tolerant linear actuator that will still produce linear movement even if one of its motors were to fail.

The Thomas O. Paine U.S. Pat. No. 3,660,704 discloses a ball screw linear actuator that is particularly suited for use aboard the space craft. It discloses a ball screw nut assembly and motor that are concentrically arranged with respect to an actuation shaft but it does not show any tolerance for failure of the drive motor and is exemplary of the prior art and its associated problems that the present invention shows an advance over.

SUMMARY OF THE INVENTION

Briefly stated, the present invention discloses a failure tolerant linear actuator intended for space vehicle applications that includes a housing and an output shaft positioned within and being rotatably supported at least at one end. A first reversible motor is disposed within the housing and while concentrically surrounding the shaft is coupled to it by means which imparts rotational movement of the motor to the shaft and permits longitudinal movement therebetween. A second reversible motor disposed within the housing also concentrically surrounds the shaft and is also coupled to the shaft by means that affects longitudinal movement of the shaft within the second motor without rotation of the shaft and permits rotation of the shaft within the second motor so as to impart predetermined reversible longitudinal movement of the shaft. Lock means are provided to selectively inhibit the rotational movement of either or both of the motors to selectively inhibit or provide for longitudinal movement of the shaft within the housing so that such inhibition or longitudinal movement may be accomplished even if one of the motors should fail to operate. The lock means are provided with plural actuation means so as to enable or inhibit linear movement, as applicable, of the shaft even if a portion of the lock means itself were to fail.

The invention will become better understood by reference to the following detailed description when considered together with the accompanying drawings, in which:

BRIEF DESCRIPTION OF THE DRAWINGS

FIG. 1 is a simplified cross sectional view of one embodiment of a linear drive mechanism constructed in accordance with the present invention.

FIG. 2 is a simplified partial perspective of the lock means of the invention shown in a locked position to preclude rotation of a rotatable portion of one of the motors.

FIG. 3 is a simplified partial perspective of the lock means of the invention shown in an unlocked position to permit rotation of a rotatable portion of one of the motors.

DETAILED DESCRIPTION OF THE PREFERRED EMBODIMENT

Referring now to the drawings in detail, and in particular to FIG. 1, reference character 10 denotes one embodiment of a failure tolerant direct drive, linear motion mechanism constructed in accordance with the present invention. The linear drive mechanism or actuator 10 includes a tubular housing 12 that is open at both ends. The housing 12 is closed at both ends by end caps 14 and 16 which are suitably secured to the housing 12 by means such as bolts which are not shown for ease of illustration, such end caps being considered to be an integral part of the housing 12. The end cap 14 may be provided with an integral flange 18 having an aperture 20 therein for purposes of securing the actuator 10 as may be required. The other end cap 16 is secured to the opposing end of the housing 12 and is provided with a suitable central bore 22.

An output shaft 24 adapted for longitudinal movement within the housing 12 is journalled in at least at one end in the housing 12. In the illustrated embodiment of the invention, the shaft 24 is journalled by suitable bearings 26 within a sleeve 28 that is slidably positioned within end cap 16. The end cap 16 may be provided with suitable seal means 30 that cooperates with the outer surface of the sleeve 28 to provide sealing engagement. The shaft 24 has a nut 29 attached to its end and a shoulder 31 cooperating with the bearings 26 during axial movement of the shaft 24 and the associated sleeve 28. The sleeve 28 is closed at its outer end and provided with an apertured flange 32 for connection as may be desired to the object to be moved with a selective reciprocative action. It will be apparent that the cooperation of the bearings 26 with sleeve 28, and sleeve 28 with end cap 16 attached to the housing 12 permit the shaft 24 to freely rotate within the housing 12 and for the end of the shaft 24 extending from the housing 12 to longitudinally move or rotate through sleeve 28 as may be required for a particular application.

A first motor 34, preferably a high torque, reversible electric motor, is positioned within the housing 12. The motor 34 concentrically surrounds one portion of the output shaft 24 and includes a first portion 36 that is fixed within the housing 12. A second portion of the motor 34 includes a rotation portion 38 that is fixed to a suitable motor sleeve 40 by any suitable means, such as keying as illustrated, the sleeve 40 then being journalled within the housing 12 by bearings 42 and 44.

The motor 34 is coupled to the shaft 24 by means to permit rotation engagement therewith and longitudinal movement therebetween. In the illustrated embodiment of the invention this means takes the form of a suitable ball bearing spline nut 46 which is fixed to the sleeve 40 by pin 47 and that cooperates with a splined portion 48 of the shaft 24.

A second motor 50, also preferably a high torque reversible electric motor, is positioned within the housing 12. The motor 50 concentrically surrounds a second portion of the shaft 24 and includes a first portion 52 that is fixed within the housing 12. A second portion of the motor 50 includes a rotation portion 54 that is fixed to a suitable motor sleeve 56, as by keying as shown, the sleeve 56 being journalled within the housing 12 by bearings 58 and 60.

The second motor 50 is coupled to the shaft by means to permit longitudinal movement of the shaft 24 within the second motor without rotation and to permit rotation of the shaft 24 within the second motor 24 so as to impart longitudinal movement of the shaft 24 in a predetermined direction. In the illustrated embodiment of the invention, this means takes the form of a suitable ball bearing screw nut 62 that is fixed to the sleeve 56 and which cooperates with a suitably threaded portion 64 of the shaft 24.

A lock means 63 is provided to selectively inhibit the rotational movement of either or both of the motors 34 and 50 to selectively inhibit or provide for longitudinal movement even if one of the motors 34 and 50 should fail to operate. Referring now to FIGS. 2 and 3, the lock means 63 will be described. Since each motor is provided with a substantially identical lock means only one lock means associated with one motor will be described.

A motor sleeve, for example sleeve 40, is provided at one end thereof with a suitable ring gear 66 disposed around its outer periphery. First and second idler gears 68 and 70 are arranged to mesh with the drive gear 66 and with each other. Since all three gears mesh it will be seen that when it is attempted to rotate the drive gear 66 in either a clockwise or counterclockwise direction the idler gear 68 will attempt to rotate in an opposite direction and will lock with the other idler gear 70 that will attempt to rotate also in a direction opposite the drive gear rotation.

The gear 68 is rotatably supported on a shaft 72 that forms part of a suitable solenoid 74. The gear 70 is also suitably rotatably supported on a shaft 76 of a solenoid 78. The solenoids 74 and 78 are of conventional construction and each includes a solenoid poppet 80 and a return spring 82. In the deenergized state of the lock means 63, the spring 82 of each solenoid will urge the gears 68 and 70 outwardly and into locking engagement with each other and with the drive gear 66.

Referring now to FIG. 3 specifically, it will be seen how the lock means may be selectively disengaged. When one of the solenoids 74 or 78 is energized the associated solenoid poppet 80 is drawn inwardly thereby drawing the respective idler gear 68 or 70 out of engagement with its companion idler gear while permitting both idler gears to remain in engagement with the drive gear 66 which is wider than either of the idler gears. Thus, the lock means 63 may be released by energization of either solenoid 74 or 78 to permit the drive gear 66 and associated means coupling the a motor to the shaft 24 to connect the rotational motion of the motor to the shaft 24.

OPERATION

A description of how the self contained linear drive mechanism 10 operates in a failure tolerant mode will now be described. Referring first to FIGS. 2 and 3 it will be seen that each idler gear 68 and 70 is associated with a solenoid that will withdraw it from locking engagement with the other locking gear and the drive gear 66. Thus, if one of the solenoids 74 or 78 were to fail an opportunity would still exist to energize the other solenoid so as to enable the idler gears to be disengaged from each other and the drive gear 66 to turn.

Next it will be seen that if the first motor 34 is locked against rotation by its associated lock means 63 that the screw nut 62 associated with the second motor 50 can still turn thereby causing the shaft 24, because of cooperation of the screw nut 62 with the threaded portion 64, to cause the shaft 24 to move axially in a predetermined direction. The spline nut 46 coupling the first motor 34 to the shaft 24 permits the shaft 24 to slide axially therewith even though the shaft 24 is held against rotational movement.

If the first motor 34 rotates, the associated spline nut will cause the shaft 24 to rotate and if the screw nut 62 associated with the second motor 50 is held against rotation the shaft 24 will rotate within the screw nut 62 and axial movement of the shaft 24 will result.

Also, the first motor 34 can be rotated in one direction while the second motor 50 is rotated in an opposing direction thereby causing the shaft 24, because of the threaded engagement with the screw nut 62 to move axially.

It will be appreciated that when the ball bearing screw nut 62 is held against rotation the rotating spline nut 46 will cause the shaft 24 to rotate while traveling linearly. If such rotation is detrimental the connection of the shaft 24 through the journal connection in end cap 16 permits rotation of the shaft 24 without rotation of the operative end 32 of the actuator 10.

Since a total of four solenoids are provided, the locking mechanisms should be tolerant of failure of at least two solenoids. Should activation of one solenoid fail, its adjacent solenoid can be activated. If it should also fail, then either of the solenoids at the opposite bearing nut sleeve can be activated. Also, if one motor fails to operate, activation of either solenoid of the opposite solenoid mechanism will allow operation of its associated motor to affect positioning of the shaft 24. For ease of illustration, all showings of electrical connections and circuitry have been omitted but such are conventional.

Changes may be made in the various elements, parts, and assemblies without departing from the spirit and he scope of the invention as defined in the following claims.

What is claimed is:

1. A failure tolerant linear actuator particularly adapted for celestial space applications comprising:
    a housing;
    an output shaft positioned within said housing and being rotatably supported at least at one end;
    a first reversible motor means disposed within said housing circumferentially surrounding a portion of the shaft and being coupled to the shaft by means to impart rotational movement therewith and permit longitudinal movement therebetween;
    a second reversible motor means also disposed within said housing circumferentially surrounding a portion of the shaft and being coupled to the shaft by means to affect longitudinal movement of the shaft within said second motor without rotation of the shaft and to permit rotation of the shaft within said second motor so as to impart longitudinal movement of the shaft; and
    lock means adapted to selectively inhibit the rotational movement of the electric motors for regulated longitudinal movement of the shaft even if one of the motors should fail to operate.

2. The linear actuator of claim 1 wherein the lock means is also positioned within the housing.

3. The linear actuator of claim 2 wherein said lock means comprises a separate lock means for each reversible motor.

4. The linear actuator of claim 3 wherein each lock means includes a drive gear circumferentially disposed on a sleeve of the motor;
    a gear means cooperating with said drive gear to turn freely with the drive gear or to lock the drive gear against rotation, and
    electrically energized selection means coupled to the gear means to select between turning of the gear means or locking of the gear means against rotation whereby the linear movement of the shaft is determined.

5. The linear actuator of claim 4 wherein the gear means includes a pair of engaged opposing gears, at least one of which is axially movable out of engagement with the other gear.

6. The linear actuator of claim 5 wherein the selection means includes a solenoid coupled to each of the engaged opposing gears so that upon energization of one of the solenoids, the opposing gear coupled to that solenoid is drawn axially out of locking engagement with the other gear while yet engaging the drive gear so that the drive gear associated with one of the reversible motors is permitted to rotate and linear movement of the shaft is determined.

7. A failure tolerant linear actuator particularly adapted to celestial space applications comprising:
    a hollow tubular housing closed at both ends by end caps;
    an output shaft rotatably supported within the housing and having at least one end extending through one end cap;
    a first reversible electric motor means disposed within said housing and having an annular rotatable portion which circumferentially surrounds a portion of the shaft, the rotatable portion being coupled to the shaft by means to permit rotational engagement therewith and longitudinal movement therebetween;
    a second reversible electric motor means disposed within said housing and having an annular rotatable portion which circumferentially surrounds a portion of the shaft, the rotatable portion being coupled to the shaft by means to affect longitudinal movement of the shaft within said second motor without rotation and to permit rotation of the shaft within said second motor so as to impart longitudinal movement of the shaft in a predetermined direction, and
    electrically energizable lock means coupled to each electric motor and adapted to selectively couple the rotational movement of either of the electric motors to the shaft to selectively inhibit and selectively provide for longitudinal movement of the shaft within the housing even if one of the motors should fail.

8. The linear actuator of claim 7 wherein the rotatable portion of the first electric motor is coupled to the shaft by a ball bearing spline nut which cooperates with suitable splines disposed on the shaft to affect rotation of the shaft and permit the shaft to longitudinally move with respect to the first electric motor.

9. The linear actuator of claim 8 wherein the rotatable portion of the second electric motor is coupled to the shaft by a ball bearing screw nut which cooperates with a screw thread disposed on a portion of the shaft to affect longitudinal movement of the shaft without shaft rotation and permit the shaft to rotate and move longitudinally with respect to the second electric motor.

10. The linear actuator of claim 9 wherein each lock means includes a drive gear disposed on the rotatable portion of each motor,
    a gear means cooperating with the drive gear to turn freely with the drive gear or to lock the drive gear and associated electric motor against rotation, and
    selection means coupled to the gear means to select between turning of the gear means and locking of the gear means against rotation whereby linear movement of the shaft with respect to the housing is determined.

11. The linear actuator of claim 10 wherein the gear means includes a pair of gears which are normally engaged with each other and with the drive gear, at least one of which gears being axially moveable out of engagement with the other gear of said gear means.

12. The linear actuator of claim 5 wherein the selection means includes a solenoid coupled to each of the gears so that upon energization of one of the solenoids, the gear coupled to that solenoid is drawn from locking engagement with the other gear while yet remaining in engagement with the drive gear associated with one of the electric motors so that the drive gear associated with one electric motor is permitted to rotate and linear movement of the shaft is determined.

13. The linear actuator of claim 9 wherein a swivel means is connected to at least one end of the shaft.

* * * * *